No. 705,265. Patented July 22, 1902.
A. MALTBY.
KNOCKDOWN BARREL, CASK, &c.
(Application filed May 18, 1901.)
(No Model.)
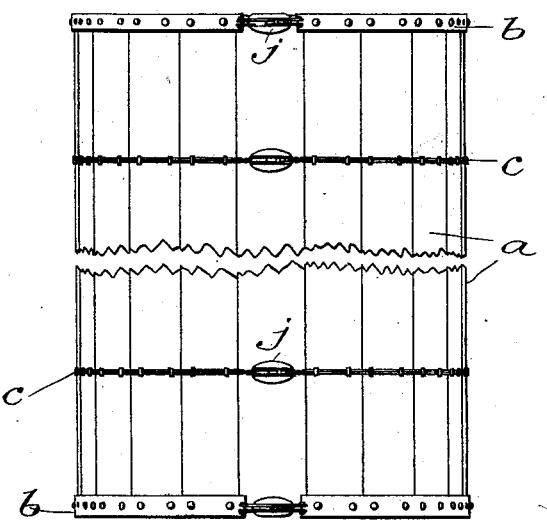
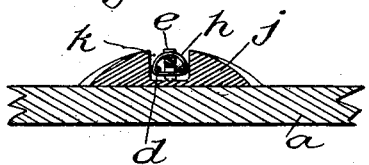
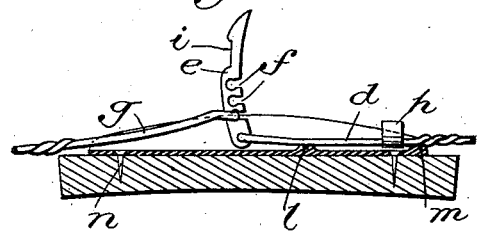
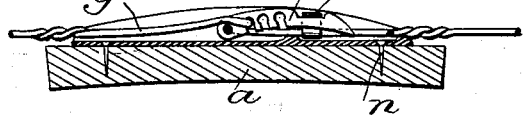
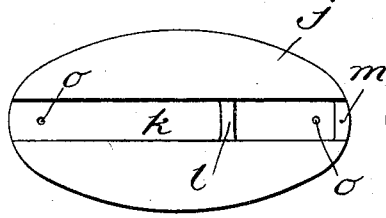
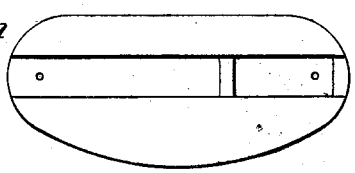
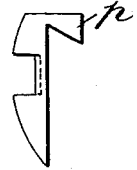
Witnesses:
George Barry Jr
Henry Thieme.
Inventor:-

UNITED STATES PATENT OFFICE.

ANSON MALTBY, OF NEW YORK, N. Y.

KNOCKDOWN BARREL, CASK, &c.

SPECIFICATION forming part of Letters Patent No. 705,265, dated July 22, 1902.

Application filed May 18, 1901. Serial No. 60,806. (No model.)

*To all whom it may concern:*

Be it known that I, ANSON MALTBY, a citizen of the United States, and a resident of the borough of Bronx, in the city and State of New York, have invented a new and useful Improvement in Knockdown Barrels, Casks, and the Like, of which the following is a specification.

My invention relates to knockdown barrels, casks, and the like in which hoops or bands are used provided with fasteners for holding the barrels or other receptacles together, the object being to provide guards for effectually protecting the fasteners which hold the barrels or other receptacles together from becoming jammed or disconnected when in use, the said guards being so constructed and arranged that the fasteners may be readily locked and unlocked when so desired.

A practical embodiment of my invention is represented in the accompanying drawings, in which—

Figure 1 represents a barrel in side elevation, showing the fasteners for securing the end of the hoops together and also the guards for protecting the said fasteners. Fig. 2 is an enlarged top plan view of one of the guards used intermediate the ends of the barrel, together with the fastener for locking the meeting ends of the hoop. Fig. 3 is a transverse section taken in the plane of the line A A of Fig. 2. Fig. 4 is a longitudinal section taken in the plane of the line B B of Fig. 2, the fastener being shown in its locked position. Fig. 5 is a similar view with the fastener shown in its unlocked position. Fig. 6 is a top plan view of the intermediate guard. Fig. 7 is a top plan view of one of the end guards, and Fig. 8 is an edge view of the same.

The knockdown barrel which is represented in the accompanying drawings is composed of a plurality of staves $a$, connected at their opposite ends by hoops $b$ and intermediate their ends by one or more hoops $c$.

In the present instance the end hoops $b$ of the barrel are represented as sheet-metal bands, while the intermediate hoops are represented as being formed of wire. Each of these hoops is provided with an adjustable fastener for holding the staves together when the barrel is set up, which fastener is constructed and arranged as follows: One end of the hoop is provided with an elongated loop $d$, to the outer end of which is loosely pivoted a locking-lever $e$, the face of which is provided with a plurality of notches $f$, fitted to receive the outer end of a loop $g$ in the other end of the hoop. A clip $h$ has a sliding engagement with the elongated loop $d$, which clip is fitted to slide over the end of the locking-lever $e$ when the lever is swung into the plane of the loop $d$ for locking the lever in its closed position. The back of the lever $e$ is provided with a shallow recess $i$ for receiving the clip to prevent its unintentional removal from its engagement with the lever. The loop $d$ is of sufficient length to permit the lever $e$ to be swung down into its closed position within the loop when the clip $h$ is slid to the limit of its inward movement.

The guard for protecting the fastener is denoted by $j$, and it has a substantially flat inner face for snugly engaging one of the staves of the barrel, while its outer face is convexed so as to present a slight resistance when the barrel is being drawn endwise over some obstruction which would engage the guard. The guard is provided with an open recess $k$ of sufficient size and depth to receive the loops at the ends of the hoop and the locking-lever and protect the locking-lever when in its closed position. The open recess $k$ is of sufficient width to permit the clip $h$ to slide along the loop $d$ within the recess.

To prevent the clip $h$ from being cramped against movement and to insure the ready locking and releasing of the lever, I provide the bottom of the open recess $k$ with an interior transverse rib $l$, located about centrally in the bottom of the recess, and an outer transverse rib $m$, located at one end of the recess. The inner end of the loop $d$ will rest upon the cross-rib $m$, and the loop at a point toward its outer end will rest upon the cross-rib $l$, thus spacing the loop $d$ from the bottom of the recess and permitting the clip $h$ to be freely moved along the loop between the two ribs. The distance between the two ribs is sufficient to permit the clip to be moved from its inoperative position out of engagement with the locking-lever to its operative position over the end of the locking-lever.

The guard may be secured to the stave in any well-known or approved manner.

I have shown the guard herein as being secured to the stave by means of nails or tacks $n$, which pass through the holes $o$ near the opposite ends of the recess $k$.

The end guards are preferably provided with lips $p$, which overlap the end of the stave to which the guard is secured, thus securing the guard firmly in position with its recess $k$ in close proximity to the end of the stave, so that the end of hoop $b$ may be secured at the extreme end of the barrel, if so desired.

It will be seen that the guards constructed and arranged as hereinabove set forth will effectually protect the fastenings of the several hoops from damage and at the same time permit the fastenings to be readily locked or unlocked, as may be desired.

While I have described my invention in connection with a barrel, it is to be understood that it may be equally well applied to casks or like articles.

It is evident that slight changes might be resorted to in the construction, form, and arrangement of the several parts without departing from the spirit and scope of my invention. Hence I do not wish to limit myself strictly to the structure herein set forth; but

What I claim is—

1. In combination, a knockdown barrel or other receptacle, a hoop therefor, a fastener for removably securing the ends of the hoop together, a guard independent of the fastener and having a recess therein for receiving and protecting the fastener and means for spacing the fastener from the bottom of the recess, substantially as set forth.

2. In combination, a knockdown barrel or other receptacle, a hoop therefor, a fastener for removably securing the ends of the hoop together, a guard having a recess therein for receiving and protecting the fastener and cross-ribs for spacing the fastener from the bottom of the recess, substantially as set forth.

3. In combination, a knockdown barrel or other receptacle, a hoop therefor, a locking-lever pivoted to one end and having a removable engagement with the other end of the hoop, a sliding clip arranged to engage and disengage the lever, a guard having a recess therein for receiving and protecting the fastener and means for spacing the end of the hoop which carries the clip away from the bottom of the recess for permitting the free sliding movement of the clip, substantially as set forth.

In testimony that I claim the foregoing as my invention I have signed my name, in presence of two witnesses, this 15th day of May, 1901.

ANSON MALTBY.

Witnesses:
 FREDK. HAYNES,
 HENRY THIEME.